March 11, 1947.  W. HARGREAVES  2,417,195
SNAP-RING SECURED, DIVIDED MOTOR CASING
Filed June 30, 1943  2 Sheets-Sheet 1
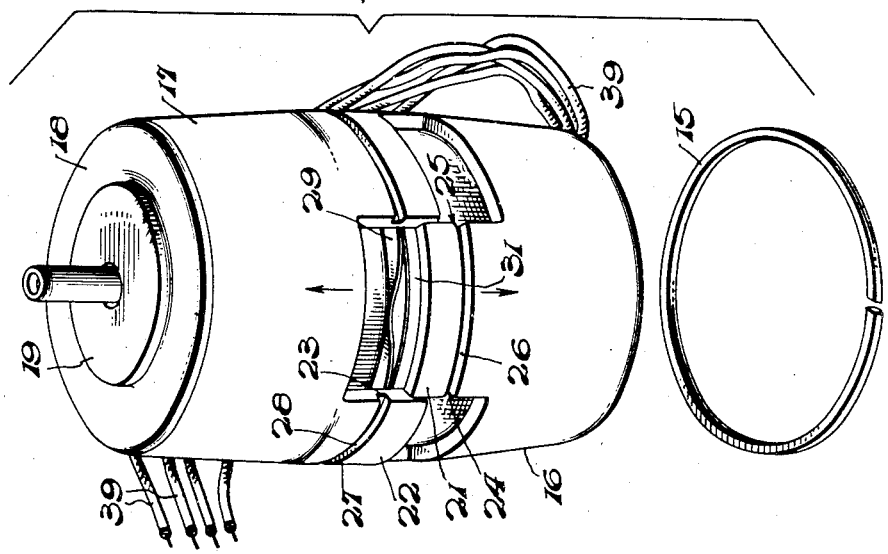
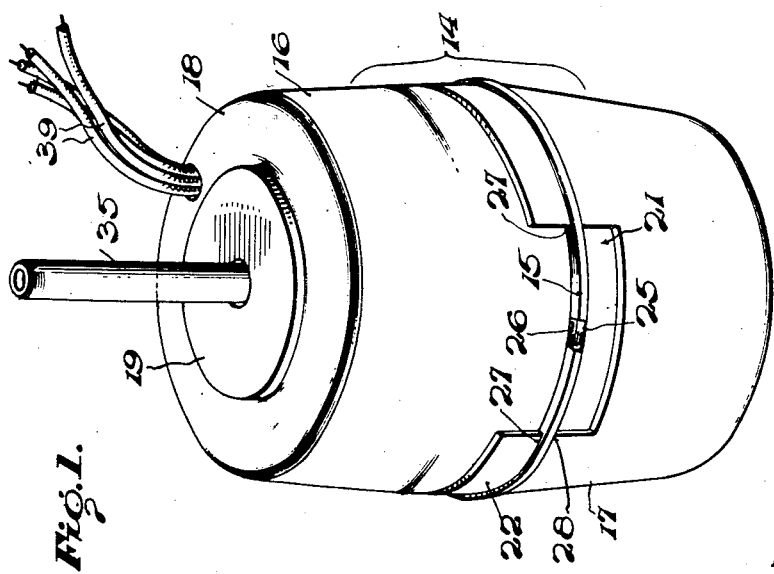
INVENTOR.
William Hargreaves.
BY
Herbert M. Birch.
Attorney

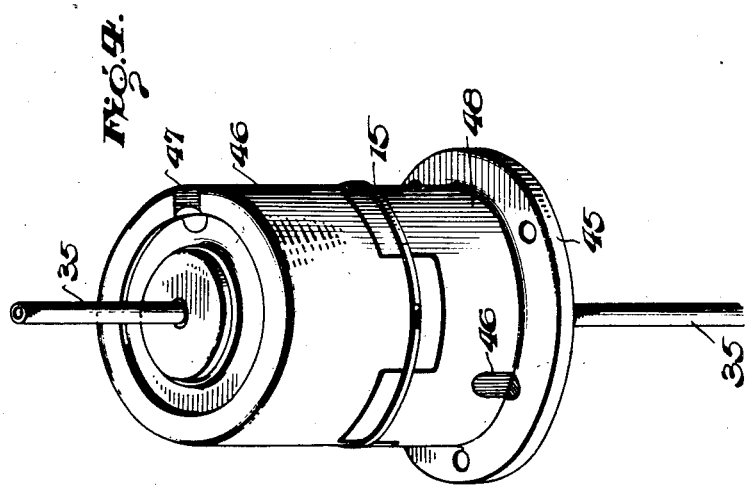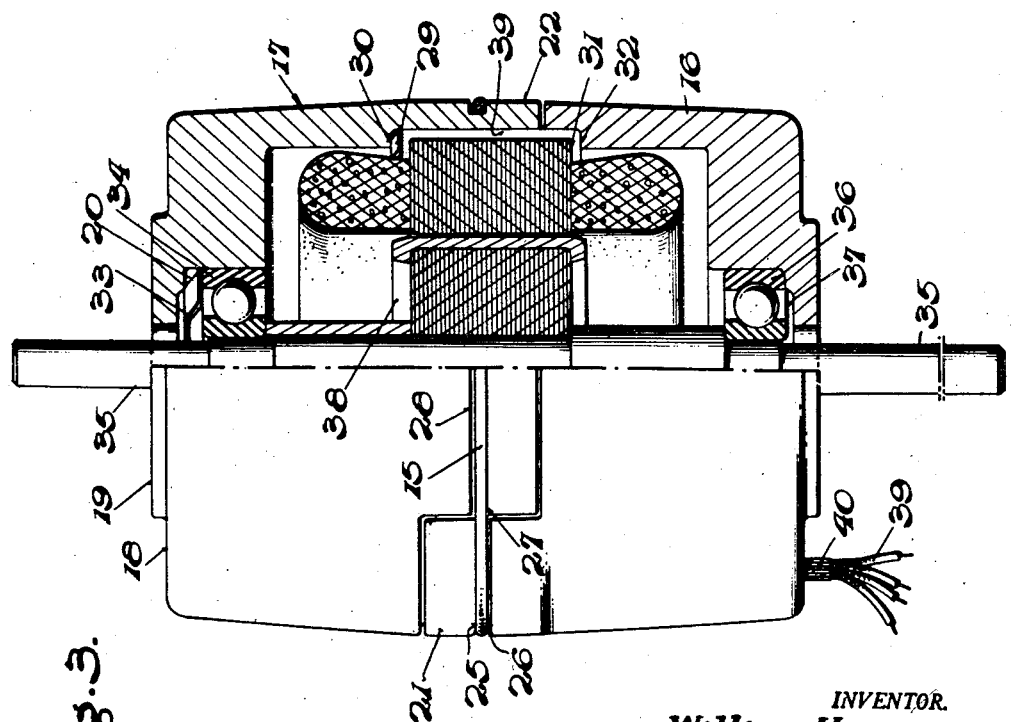

Patented Mar. 11, 1947

2,417,195

UNITED STATES PATENT OFFICE 2,417,195

SNAP-RING SECURED, DIVIDED MOTOR CASING

William Hargreaves, Bergenfield, N. J., assignor to Bendix Aviation Corporation, Teterboro, N. J., a corporation of Delaware Application June 30, 1943, Serial No. 492,925

7 Claims. (Cl. 171—252)

The present invention relates to assembly systems and more particularly to a novel knockdown assembly system and a novel method for its performance.

Conventional systems and methods used in assembling parts of apparatus, such as power units, signal units, electric motors, generators and the like within a housing or casing require numerous screws, bolts and other tool applied parts. Tools are also necessary in conventional systems to connect the component parts in bearing supports and other necessary supporting elements. Likewise, repair work requires disassembly of various parts with tools to fit special nuts and bolts requiring experienced disassemblers.

Such conventional apparatus assembly and disassembly methods and systems are arduous and time consuming and present a constant major problem to time study engineers. Time study engineers prior to the present invention, to meet production requirements, tried to solve the assembly problem in the usual way. They increased rapidity and efficiency of the various apparatus production to a limited extent by using groups of specially trained assemblers, assigning one group to assemble apparatus parts, another group to fasten bolts and screws and so on. Although the time study experts mathematically stepped up production and efficiency to a limited degree by increasing the quality and number of employed craftsmen, they also increased production costs.

Accordingly, a new solution amounting to more than a mere partial or intangible mathematical correction of the foregoing problem was in demand, as essential to obtain higher production efficiency. An object of the present invention, therefore, is to provide novel means whereby such higher production efficiency can be obtained. This highly desirable end is accomplished by providing novel apparatus adapted for rapid assembly and disassembly together with a novel method for its performance, permitting utilization of one unskilled worker, where two or more skilled craftsmen were required before, and to provide for a minimum assembly time even though the assembler is unskilled, thereby resulting in materially decreasing production costs.

Another object of the present invention is to provide novel apparatus adapted for rapid assembly and disassembly without the use of threaded parts, tools, etc.

A further object is to provide a novel assembly casing for electrical apparatus including a novel hand applied coupling arrangement, whereby rapid and efficient assembly of such apparatus without tools by inexperienced labor is made practical.

A further object is to provide a quickly assembled novel casing, whereby a plurality of demountable apparatus parts may be disassembled by a single demountable coupling member for repair and/or replacement of parts.

Still a further object of the invention is to provide novel knockdown devices such as motors, signal units, and the like without tool applied parts.

And yet a further object is to provide a novel knockdown motor or the like assembly case having interlocking sections, so shaped and so proportioned, as to hold the motor parts in operative assembled position when the case sections are interlocked and coupled together.

Another object is to provide a novel housing for motors or the like comprising a collapsible housing provided with interleaving sections which are adapted for rapid interlocking by means of hand operated clamping means.

The above and other objects and advantages of the present invention will appear more fully hereinafter from a consideration of the detailed description which follows, taken together with the accompanying drawings wherein two embodiments of the invention are illustrated. It is to be expressly understood, however, that the drawings are for the purpose of illustration only and any devices described specifically are to explain the system and are not designed as a definition of the limits of the invention.

In the drawings, wherein like reference numerals represent like parts in the several views:

Figure 1 is a perspective view of a motor provided with the novel assembly of the present invention.

Figure 2 is a perspective view of the motor shown in Figure 1 with the outer casing sections uncoupled and slightly parted with the snap coupling ring detached.

Figure 3 is a side longitudinal view partly in cross section of the assembled motor; and Figure 4 is a perspective view of another form of a novel casing which may be used in connection with a signal device, such as an electrical signal unit for use as an aircraft accessory device.

Referring to Figure 1 in detail, numeral 14 designates for example, an assembled electric device, such as a motor, generator or signal device, which includes a sectional casing having two hollow bell sections 16 and 17 coupled together by a snap or split spring coupler ring 15.

Each bell section is identically constructed both exteriorly and interiorly, the only distinction residing in the position of the resilient elements, hereinafter described, housed in bell section 17. Bells 16 and 17, see Figures 2 and 3, the latter being a twin of bell 16, may be any suitable shape, such as a cylinder having a centrally apertured top portion 18 with a raised annular end plate 19, defining the bottom of a bearing socket 20 formed within bells 16 and 17, and an open bottom rim having a plurality of alternately spaced recesses or notches and protrusions, lugs or segments 21 and 22.

Lugs or segments 22 are so shaped and so proportioned as to form an interlocking joint connection with lugs 21 of bell section 16. The lugs 21 and 22 are arcuately grooved or provided with circumferential seats, as at 23 and 24, better shown in Figure 2, so that when the two bell sections 16 and 17 are pressed tightly together the arcuate grooves 24 of bell 16, and 23 of bell 17, form one complete circle. Grooves 23 and 24 provide seats and lateral circumferential walls or surfaces 25 and 26, 27 and 28, that extend transverse the longitudinal ends of each lug.

Surfaces 25 formed by grooves 24, and surfaces 26 formed by grooves 23, are coupling surfaces designed to press against alternate opposite sides of snap or split spring coupler ring 15 when expanded, slipped over the sections and snapped or allowed to contract into the grooves. Such coupling action is generated by compression of normally expanded coupling, loading or biasing spring 29, seated inside bell 17 on an annular flange 30, see Figure 3, in cooperation with stator 31 seated inside bell 16 on an opposed annular flange 32.

Seated in bearing socket 20 of bell 17 is a resilient member, as loading or biasing spring 33 in contact with a bearing 34, which may be of the ball bearing type illustrated. Spring 33 tends to separate or force bearing 34 apart from the top portion 18 and end plate 19 of section 17 and prevents any longitudinal play or thrust of rotor shaft 35 journalled in bearing 34, after the device is assembled.

Rotor shaft 35 is also journalled in a bearing 36 seated in socket 37 of bell 16, rotor 38 being attached to shaft 35 intermediate the bearings 34 and 36.

Positioned around rotor 38 is the stator 31, which fits between bell sections 16 and 17 within annular countersunk chamber 39 defined by annular flange 30 of bell 17 and annular flange 32 of bell 16.

*Assembly operation*

Assuming for the sake of example, an electrical device, such as a motor is knocked down or is in disassembled form, the first step for complete assembly of the motor is to position the motor parts in bell member 17 as follows: insert spring 33 in bearing socket 20, place the coupling spring 29 on flange 30, insert stator 31 against spring 29, secure bearings 34 and 36 to rotor shaft 35 on either side of rotor 38 and then insert the bearing 34 within socket 20 against spring 33.

After bell section 17 has been filled with the loosely positioned motor parts, bell section 16 is inserted over rotor shaft 35 and power cables 39 are threaded through a bushing 40 formed on bell 16. Bell section 16 is then pushed together with bell section 17, over the motor parts, so that bearing 36 seats in bearing socket 37 and lugs 21 of bell 16 interlock or interleave with lugs 22 of bell 17 in a dovetail or like joint.

Pressure is now applied to each bell section to overcome the resistance of coupling spring 29, so as to compress spring 29 between flange 30 and stator 31 and so as to align grooves 23 and 24 end to end to form a complete circle or circumscribing groove or seat, and then snap ring 15 is inserted in the grooves and pressure is released. Upon release of manually applied pressure, the spring 29 expands and moves surfaces 25 and 26 of grooves 24 and surfaces 27 of grooves 23 in opposite directions, against the alternate opposite sides or side portions of coupling ring 15 and grips the same to the extent of a slight distortion thereof tending to disalignment due to the engagement of alternate portions at opposite sides, to prevent accidental displacement of ring 15 from the grooves, see Figure 3.

In Figure 4 is illustrated a modified form of the novel casing which is adapted for use in connection with signalling units, and other accessory devices. An apertured flange 45 is formed with or secured to one of the end bells and is adapted to be secured to a panel, not shown, and cable openings 46 and 47 are elongated, so as to provide for projection of power cables from either the side or the top of the respective hub sections 48 or 49. Otherwise, the device of Figure 4 is identical to that illustrated in Figures 1, 2, and 3, previously described in detail.

There is thus provided a novel apparatus assembly system and method eliminating all use of nuts, bolts, screws, and other threaded parts requiring the use of tools or any of the usual time impeding devices and which is simple, so that even unskilled labor may efficiently assemble or disassemble the apparatus in minimum time.

While only two embodiments of the invention have been illustrated and described, other changes and modifications which will now appear to those skilled in the art, may be made without departing from the scope of the invention. Reference is, therefore, to be had to the appended claims for a definition of the limits of the present invention.

What is claimed is:

1. A casing for power responsive devices comprising cooperating members, each of said members having a plurality of alternately spaced segments whereby the segments of one member inter-engage with the segments of the other member, arcuate surfaces carried by each of said segments whereby opposed continuous annular surfaces are defined when said segments are firmly inter-engaged, resilient means interposed between said sections adapted to resist said firm engagement of said segments, and an annular coupling member adapted to seat between said continuous annular surfaces defined by said arcuate surfaces, whereby the members are adapted to be coupled together firmly against resistance of said resilient means and said annular coupling member is held against accidental displacement by opposed pressures from said arcuate surfaces on each side thereof at opposed alternate points.

2. An apparatus casing comprising two bell members, a plurality of lugs around the peripheral rim of each bell, an annular flange at the base of said lugs within one of said bells, a coupling spring seated on said flange, a stator and rotor assembly mounted within said bells, said stator being adapted to seat against said coupling spring, each of said lugs having an annular groove therein spaced equally from the rim of each bell lug, said coupling spring normally holding the ends of each groove of each bell lug out of alignment, until said bells are pushed together, and a coupling ring adapted to snap within the annular groove formed by such alignment, so as to press against the walls of said grooves in the direction of each bell lug rim in response to the expansion of said coupling spring.

3. A knockdown device comprising inter-engaging assembly sections, support means in each assembly section, a coupling spring, a seat for said spring associated with one of said assembly sections, means adapted to be seated in said support means of the other assembly section extending therefrom adapted to extend into said first assembly section adjacent said coupling spring seated therein, whereby to pilot said inter-engagement of said sections and compress said spring when said sections are inter-engaged, and coupling means adapted to hold said sections coupled together against the expansion of said coupling spring when compressed between said seat and said means seated in said support means of each inter-engaged section.

4. A knockdown apparatus assembly comprising a casing having a pair of interlocking sections, a rotor shaft, a bearing socket in each section, resilient means in one of said bearing sockets to prevent end thrust of said rotor shaft, an annular flanged portion in each section adapted to form a stator supporting chamber when said sections are together, a second resilient means normally adapted to resist interlocking of said sections, a plurality of staggered transversely grooved interlocking members associated with each interlocking section adapted when pushed together to form a complete annular groove, and a snap ring adapted to interfit within said annular groove in the interlocking members, whereby said grooves of each staggered interlocking member are maintained in substantial alignment against the longitudinal thrust of said second resilient means to thereby secure the above apparatus parts in operative assembled position.

5. An assembly casing for knockdown motor parts or the like comprising a pair of bell members, one of said bell members having an apertured outer flanged head portion and a rim with a plurality of peripherally grooved lugs, the other of said bell members having a rim with a plurality of peripherally grooved lugs adapted to interlock with said grooved lugs of said bell with the flanged head to thereby define an annular groove around the circumference of said interlocked bells, circumferential coupling means adapted to fit in said annular groove to couple said lugs together against accidental separation, and a plurality of cooperatively opposed sockets and flanges within each bell member adapted to hold said knockdown motor parts or the like together in assembled position, when the said bell members are coupled together.

6. An apparatus casing comprising, part supporting members having end walls and interfitting portions, resilient means tending to separate said members and parts, and separable means circumscribing said members at the interfitting portions and inter-engaging therewith to couple said members together against the action of said resilient means and adapted to hold the latter compressed and to be held under tension thereby.

7. An apparatus casing comprising, part supporting members having end walls and interfitting grooved portions, which when interlocked form a continuous peripheral groove, resilient means tending to separate said members and parts, and a resilient snap ring circumscribing said members at the interfitting portions and inter-engaging the peripheral groove formed to couple said members together against the action of said resilient means adapted to hold the latter compressed and to be held under tension thereby.

WILLIAM HARGREAVES.

REFERENCES CITED

The following references are of record in the file of this patent:

UNITED STATES PATENTS

| Number | Name | Date |
|---|---|---|
| 521,063 | Wettstein | June 5, 1894 |
| 1,721,419 | Staak | July 16, 1929 |
| 1,926,441 | Gilbert | Sept. 12, 1933 |
| 816,703 | Bewley | Apr. 3, 1906 |
| 2,040,371 | Gough | May 12, 1936 |
| 1,734,236 | Smith et al. | Nov. 5, 1929 |
| 2,007,398 | Kobzy | July 9, 1935 |
| 1,457,155 | Fey | May 29, 1923 |
| 889,786 | Keiner | June 2, 1908 |
| 212,064 | Spencer | Feb. 4, 1879 |
| 1,984,570 | Emmons | Dec. 18, 1934 |
| 165,909 | Wyvell | July 20, 1875 |
| 1,274,108 | Tucker | July 30, 1918 |

FOREIGN PATENTS

| Number | Country | Date |
|---|---|---|
| 6,481/32 | Australian | Mar. 7, 1933 |